Figure 1:
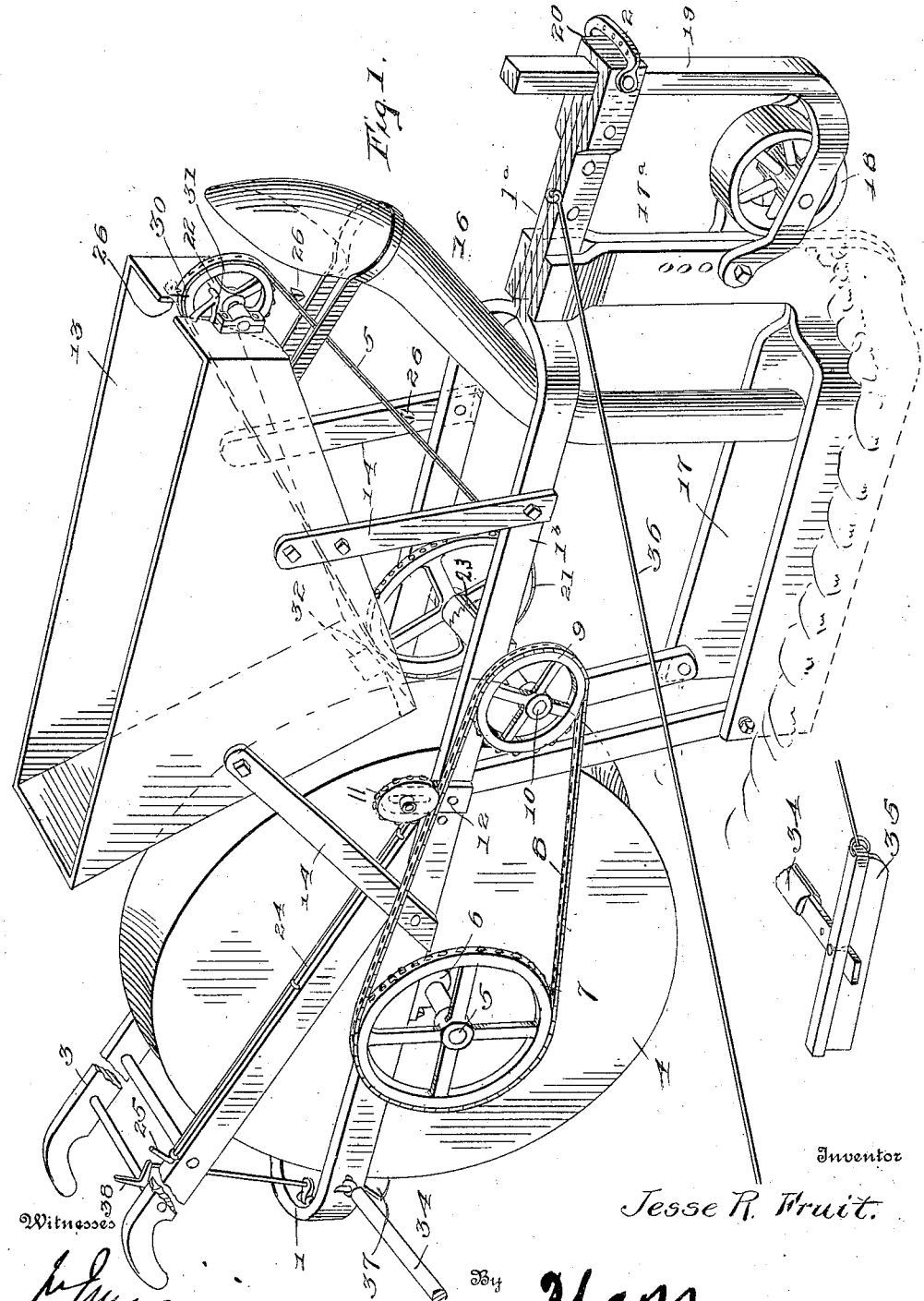

J. R. FRUIT.
POTATO PLANTER.
APPLICATION FILED MAY 21, 1908.

914,564.

Patented Mar. 9, 1909.
2 SHEETS—SHEET 1.

Witnesses

Inventor
Jesse R. Fruit.
By
Attorneys

J. R. FRUIT.
POTATO PLANTER.
APPLICATION FILED MAY 21, 1908.
914,564.
Patented Mar. 9, 1909.
2 SHEETS—SHEET 2.
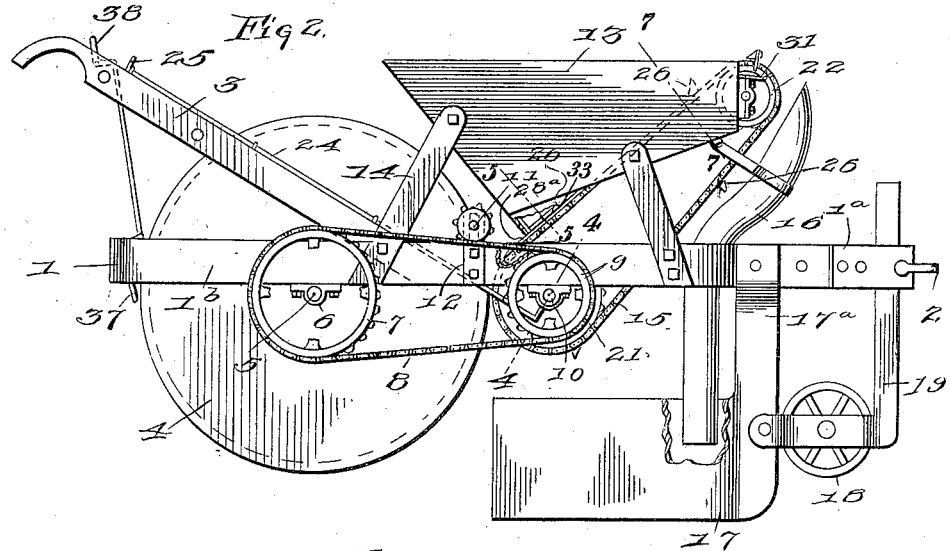
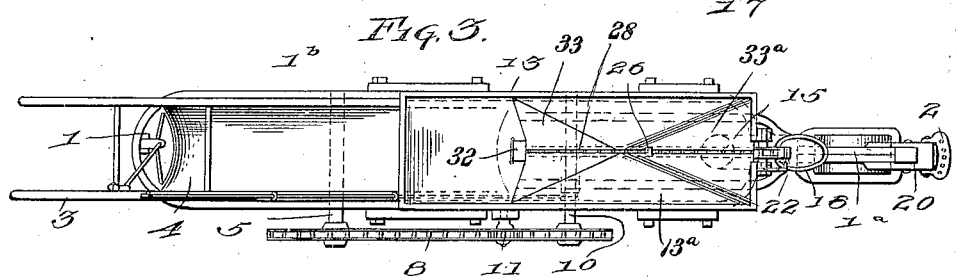
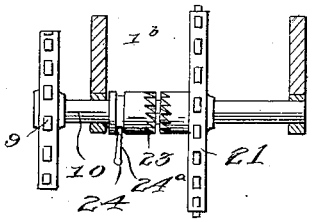
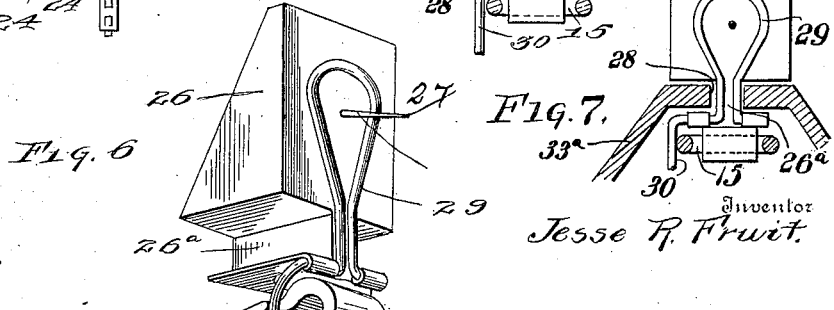
Inventor
Jesse R. Fruit.

UNITED STATES PATENT OFFICE.

JESSE R. FRUIT, OF HEYBURN, IDAHO.

POTATO-PLANTER.

No. 914,564.   Specification of Letters Patent.   Patented March 9, 1909.

Application filed May 21, 1908. Serial No. 434,185.

*To all whom it may concern:*

Be it known that I, JESSE R. FRUIT, citizen of the United States, residing at Heyburn, in the county of Lincoln and State of Idaho, have invented certain new and useful Improvements in Potato-Planters, of which the following is a specification.

The present invention relates in general to agricultural implements, and more particularly to an improved potato planter embodying novel means for positively engaging the seed potatoes and dropping them into the furrow at stated intervals, and also provided with means for regulating the depth at which the seed potatoes are planted.

The object of the invention is the provision of a simple and compact planting machine which can be readily drawn by a single horse and controlled by a single person, and which will operate in an effective manner to accomplish the desired result.

With this and other objects in view that will more fully appear as the description proceeds, the invention consists in certain constructions and arrangements of the parts that I shall hereinafter fully describe, and then point out the novel features thereof, in the appended claims.

For a full understanding of the invention and the merits thereof, and to acquire a knowledge of the details of construction, reference is to be had to the following description and accompanying drawings, in which:

Figure 1 is a perspective view of a potato planter embodying the invention; Fig. 2 is a side elevation of the same; Fig. 3 is a top plan view; Fig. 4 is a detail view of the clutch mechanism for throwing the feeding devices into operation; Fig. 5 is an enlarged sectional view on the line 5—5 of Fig. 2; Fig. 6 is an enlarged detail view of one of the wings upon the feed belt. Fig. 7 is an enlarged sectional view on the line 7—7 of Fig. 2.

Corresponding and like parts are referred to in the following description, and indicated in all the views of the drawings, by the same reference characters.

Referring to the drawings, the numeral 1 designates the frame of the planter, the said frame being shown in the present instance as formed from a single bar which is doubled upon itself, the ends of the bar being brought together at the forward portion of the frame, as indicated at $1^a$, while at the rear portion of the frame, the portions of the bar are spaced from each other, as indicated at $1^b$. A clevis 2 of the conventional construction is applied to the forward extremity of the frame, and handles 3 project rearwardly from the frame, and constitute a means whereby the planter may be guided in its movements, by an operator following behind the same. Arranged between the spaced sides of the rear portion $1^b$ of the frame is a drive wheel 4 which is rigid with a shaft 5 journaled within bearings 6 secured to the frame. One end of this shaft 5 projects beyond the frame, and is provided with a sprocket wheel 7 engaging a chain 8 which also passes around a second sprocket wheel 9 rigid with a second shaft 10 journaled upon the frame in advance of the drive wheel 4. A belt tightening wheel or idler 11 is provided for taking up any slack in the chain 8, and this belt tightening wheel 11 is adjustably mounted upon a standard 12 so as to be moved vertically thereon as required.

A hopper 13 is supported on the frame 1 immediately in front of the drive wheel 4, and is held rigidly in position by the braces 14. An endless chain or belt 15, which is driven by the shaft 10, passes under the hopper 13, and means are provided for co-operation with this chain 15 to engage the seed potatoes in the hopper and discharge them into the upper end of a feed tube 16 leading downwardly to a furrow opening share or shoe 17. This furrow opening share 17 is carried by a standard $17^a$ projecting upwardly from the forward end thereof, and bolted or otherwise rigidly connected to the forward portion $1^a$ of the frame.

For the purpose of regulating the depth to which the furrow opening share 17 will operate, a gage wheel 18 is utilized, the said gage wheel being journaled upon a standard 19 which is adjustably connected to the main frame 1 of the planter, to admit of the gage wheel being raised and lowered as desired. In the present instance, the upper end of the standard 19 is adjustably clamped within a socket 20 at the forward portion of the main frame 1, while the lower portion of the standard 19 is bent rearwardly and secured to the furrow opening share or shoe 17. It will thus be obvious that by vertically adjusting the gage wheel 18, the depth to which the potatoes will be planted may be regulated as desired.

The endless belt or chain 15, the upper reach of which passes under the hopper 13, extends around a wheel 21, loose upon the shaft 10, and also around a wheel 22 journaled at the upper and forward portion of the hopper. Carried by the endless belt 15 at suitable intervals are the wings 26 which are connected thereto by shanks 26ª designed to be received within a slot 28 in the bottom of the hopper. It will thus be obvious that the upper reach of the chain will travel along the bottom of the hopper while those wings projecting from the upper reach of the chain will travel within the interior of the hopper. At the point where the wings 26 enter the hopper at the bottom thereof an inwardly swinging flap 32 is provided to prevent loss of the seed potatoes and the slotted side of the hopper projects slightly beyond the bottom thereof as indicated at 28ª, the slot within this projecting portion being flared so as to receive and direct the shanks 26ª in their movement. Projecting forwardly from each of the wings is a prong 27, the said prongs being designed to positively engage the seed potatoes as the wings are drawn through the hopper.

The invention also provides means for positively disengaging the seed potatoes from the prongs 27 and dropping them into the mouth of the feed tube 16 as they are being carried around the upper wheel 22. For this purpose, a trip lever 29 is pivotally mounted upon each of the wings 26, the said trip levers being formed with loops surrounding the prongs 27 and also with the downwardly extending arms 30. Projecting forwardly from the hopper upon one side of the upper wheel 22 is a trip member 31 designed to successively engage the arms 30 of the trip levers, when the machine is in operation. The trip levers 29 are normally swung rearwardly against the wings 26, so that the prongs 27 are unobstructed and may operate in an effective manner to engage the seed potatoes as they are drawn through the hopper. However, as the various wings 26 pass around the upper guide wheel 22, the seed potatoes carried thereby are held directly over the mouth of the feed tube 16, and while thus positioned, the arms 30 engage the trip member 31 and thereby operate the trip levers 29 to disengage the seed potatoes from the prongs, so that they will drop into the feed tube and be guided thereby to the depositing share 17.

A clutch 23 is utilized for locking the wheel 21 upon the shaft 10 or permitting it to rotate freely thereon as desired, and this clutch is operated by an arm 24ª projecting from a rock shaft 24 which extends along the handle 3 and is journaled thereon, the rear end of the rock shaft terminating in a handle or finger-piece 25. With this construction it will be clearly apparant that the operator can control the feed mechanism without leaving his position at the rear of the planter.

Specifically describing the hopper 13 it will be observed that the front and rear ends thereof are inclined downwardly toward each other and that the feed belt travels along the lower face of the inclined front of the hopper, the wings carried by the feed belt entering the hopper through an opening provided at the intersection of the front and rear sides at the bottom thereof. The lower portion of the front 13ª of the hopper is longitudinally depressed to form a trough 33 into which the seed potatoes are forced by the action of gravity and the wings travel along the bottom of this trough so that the planter will operate in an effective manner until the supply of seed potatoes within the hopper has been completely exhausted. It will also be observed that the upper portion of the front of the hopper is bulged inwardly at 33ª, the wings traveling along the ridge formed by the inwardly bulged portion so that any seed potatoes which might have been carried up by the wings without being positively engaged thereby will roll downwardly along the inclined walls of the inwardly bulged portion 33ª and find their way back into the bottom of the hopper.

Projecting laterally from the rear of the frame 1 and loosely connected thereto, is a marker bar 34 having a marker shoe 35 adjustably connected to the extremity thereof. The forward portion of this shoe 35 is connected by a cable 36 to the front of the main frame 1 of the planter, which serves in the usual manner to hold the marker shoe in proper position during the operation of the planter. This marker bar may be quickly applied to either side of the planter as desired, and operates in the usual manner to facilitate the proper spacing of the rows.

The rim of the drive wheel 4 has a concave formation, to press the soil firmly over the deposited potatoes, thereby assisting in retaining the moisture within the soil. A scraper 37 for removing the dirt from the concave periphery of the drive wheel 4, is provided, and this scraper is controlled by a finger piece 38 upon the handle 3. The spacing between the seed potatoes dropped into the furrows, is controlled by the size of the wheel 9 which is detachably applied to the shaft 10, and it is contemplated to provide each planter with a number of wheels of various sizes, the said wheels being adapted to be used interchangeably, and the spacing of the seed potatoes in the furrow being closer with the smaller wheels 9 than with the larger wheels 9.

With this construction, it will be obvious that as the planter is drawn across the field, motion will be imparted from the drive wheel 4 to the shaft 10, and when the wheel 21 is locked upon this shaft by means of the clutch mechanism 23, the wings 26 upon the feed belt 15 will be drawn through the hopper 13.

During the passage of these wings through the hopper, the seed potatoes, which are forced within the trough 33 by the action of gravity, are engaged by the prongs 27 and carried thereby to the upper portion of the hopper. The trip member 31 then acts as previously described to operate the trip levers 29 and disengage the seed potatoes from the prongs so that they drop into the tube 16, by means of which they are delivered to the furrow opening share 17. The drive wheel 4 then serves to press the soil, which has been previously loosened by the share, firmly around the seed potatoes in such a manner as to retain the moisture within the earth.

Having thus described the invention, what I claim is:

1. In a planter, the combination of a main frame, a drive wheel journaled upon the main frame, a hopper mounted upon the main frame and formed with a slotted side, an endless belt passing along the slotted side of the hopper and driven by the drive wheel, wings carried by the endless belt and adapted to travel through the hopper, seed engaging prongs projecting from the wings, a trip lever pivotally mounted upon each of the wings and formed with a loop surrounding the seed engaging prongs and also with an arm, a depositing mechanism upon the frame, and a trip member arranged in the path of the arms of the trip levers for moving the latter to release the seeds from the seed engaging prongs and deliver them to the depositing mechanism.

2. In a planter, the combination of a main frame, a depositing mechanism upon the frame, a hopper carried by the frame and formed with an inclined side the lower portion of which is provided with a trough while the upper portion is provided with a ridge, an endless belt mounted upon the frame and traveling along the bottom of the trough and the top of the ridge, and means upon the endless belt for engaging seeds from the hopper and delivering them to the depositing mechanism.

3. In a planter, the combination of a main frame, a depositing mechanism upon the main frame, a hopper carried by the main frame and formed with an inclined side having the lower portion thereof depressed to form a trough while the upper portion is bulged to form a ridge, an endless belt mounted upon the main frame and traveling along the bottom of the trough and the top of the ridge, wings carried by the endless belt, seed engaging prongs projecting from the wings, and means for releasing the seeds from the seed engaging prongs and delivering them to the depositing mechanism.

In testimony whereof I affix my signature in presence of two witnesses.

JESSE R. FRUIT. [L. S.]

Witnesses:
   Geo. G. Newlon,
   F. M. Snyder.